Figure 3:
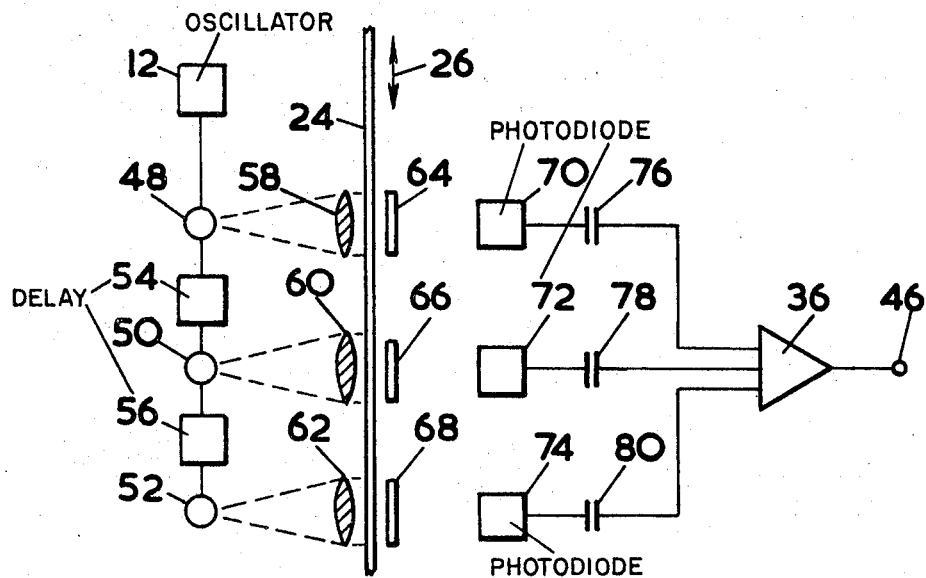

United States Patent [19]

Russell

[11] 3,748,486
[45] July 24, 1973

[54] POSITION DETECTION AND CONTROL DEVICES

[75] Inventor: Alexander Russell, East Kilbride, Glasgow, Scotland

[73] Assignee: Secretary of State for Trade and Industry in Her Britannic Majesty's Government of the United Kingdom of Great Britain and Northern Ireland, London, England

[22] Filed: Dec. 21, 1971

[21] Appl. No.: 210,332

[52] U.S. Cl............ 250/231 R, 250/237 G, 318/560
[51] Int. Cl. .............................................. G01d 5/34
[58] Field of Search................ 250/208, 209, 237 G, 250/220 R, 231, 231 P; 356/167–170; 318/560

[56] References Cited
UNITED STATES PATENTS

| | | | |
|---|---|---|---|
| 2,886,718 | 5/1959 | Shepherd et al. | 250/220 R |
| 3,227,888 | 1/1966 | Shepherd et al. | 250/237 G |
| 3,351,768 | 11/1967 | Cooke | 250/237 G |
| 3,500,055 | 3/1970 | Russell et al. | 356/167 X |

Primary Examiner—Walter Stolwein
Attorney—Gordon W. Daisley

[57] ABSTRACT

Apparatus for monitoring relative movement of a member, which includes an extended diffraction grating, a plurality of cooperating index gratings, at least one source of cyclically modulated radiation and photoelectric transducer means arranged so that the extended grating is mounted on the movable machine part and cyclically modulated radiation passes through the extended grating and the fixed index gratings to the photo-electric transducer means so as to produce therefrom, through the moire fringe effect, a cyclic electrical signal which is constant in phase while the member is stationary and varies in phase in accordance with movement of the member.

11 Claims, 6 Drawing Figures

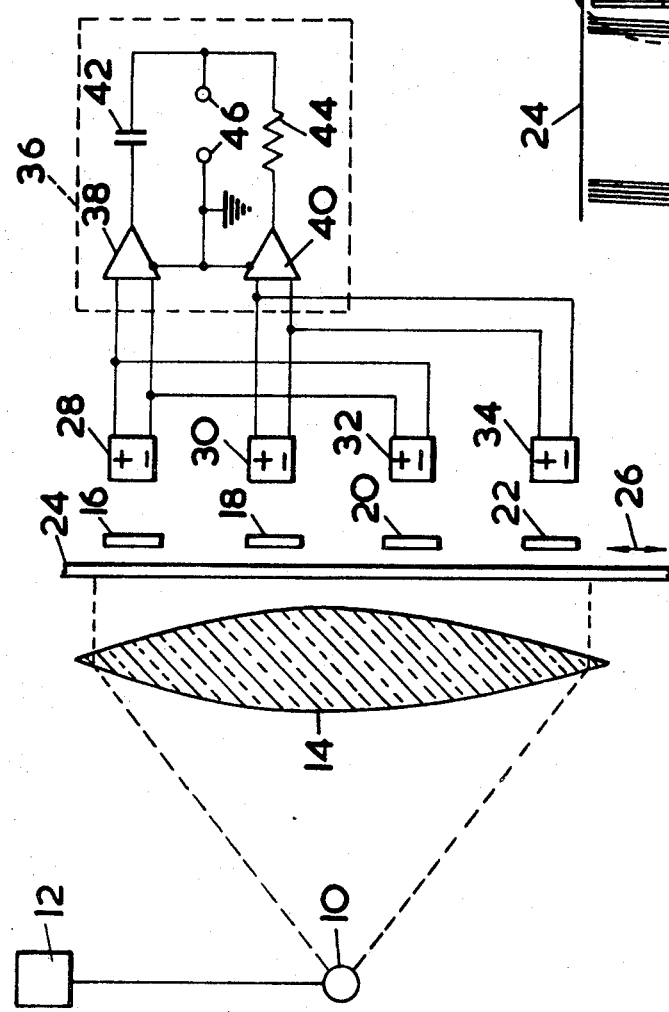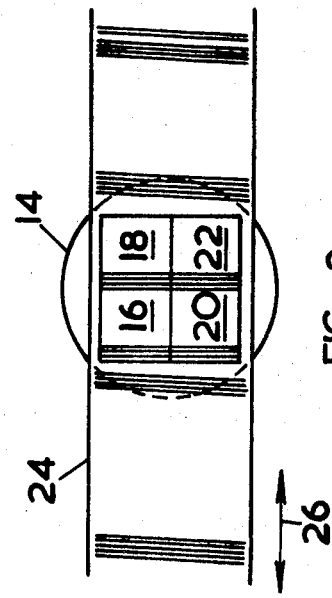

POSITION DETECTION AND CONTROL DEVICES

This invention relates to position detection and control devices suitable for use with e.g. precision machines or apparatus such as machine tools.

It is well known to utilize moire fringes produced by two optical gratings arranged with an angle between the grating lines and attached to a fixed and a moving member of, for example, a machine tool, as part of a position measuring system. It is also known to use coarse gratings in conjunction with an interpolation system to give a high-resolution measuring system, such as observation of a fringe at four points followed by integration to give a sine wave for comparison with a master sine wave. In previous systems of conventional kind, any change of phase required was brought about by means of mechanical moving parts, having the disadvantages of complication and the introduction of vibration.

According to the invention a time-phase transducer comprises an extended diffraction grating, a set of at least two index diffraction gratings each of which can coact with part of said extended grating to produce an individual moire fringe pattern, the extended grating and the set of gratings being capable of relative movement, a source of cyclically modulated radiation of a given frequency which can illuminate the aforesaid gratings to produce the individual moire fringe patterns, either the radiation source producing a plurality of radiations of said given frequency but of different individual phases for each individual index grating and/or each index grating having an individual phase relationship with the extended grating whereby the resulting output arising from each index grating is a plurality of cyclically modulated beams of radiation bearing moire fringe patterns which differ in phase in a cyclically symmetrical manner, photo-electric transducer means for receiving the resulting outputs arising from each index grating and combining them to produce at least one cyclically modulated output signal which in consequence varies in phase in accordance with any relative movement between the extended grating and the set of index gratings.

According to an optional feature of the invention one radiation source produced a single modulated radiation and $n$ index gratings (where $n$ is at least 3) are provided, arranged so that the moire fringe patterns differ from one another in spatial phase by a whole multiple of $1/n$ of 360°. Preferably four index gratings are provided, differing in spatial phase by 90° or multiples thereof, four photo-electric cells for receiving the outputs from each index grating, and a phase shifting circuit to which the photo-electric cells are connected in inverse parallel and which imposes a relative phase shift of 90° on one input compared with that imposed on the other input so as to produce an output therefrom which contains the modulation frequency of the radiation source and varies in phase with relative movement between the extended grating and the index gratings; the phase shifting circuit being desirably a resistance-capacitance circuit.

According to a further optional feature of the invention $n$ radiation sources are provided, where $n$ is at least 3, a corresponding number of index gratings and photo-electric cells, and oscillator means arranged to modulate the outputs of the radiation sources so that they differ from one another in time-phase by whole multiples of $1/n$ of 360°. Preferably signal output means are provided which comprise a summing circuit, to the input of which the outputs of the photo-electric transducer means are connected so that the output of the signal output means has substantially the same frequency as the modulation and varies in phase with relative movement between the extended grating and the set of index gratings.

According to another optional feature of the invention the photo-electric transducer means has a single photo-electric cell and focusing means intermediate the set of index gratings and the photo-electric cell arranged so that any resulting output arising from each of the gratings in the set of gratings is focused onto the photo-electric cell with the result that the output of the photo-electric transducer means has substantially the same frequency as the modulation of the radiation source and varies in phase with relative movement between the extended grating and the set of index gratings.

According to yet another optional feature of the invention a synchro-resolver, a phase-sensitive detector, a servo-motor and a revolution counter are arranged so that any cyclically modulated output signal is fed to the stator of the synchro-resolver, any resulting electrical output signal from the rotor of the synchro-resolver is fed to the phase-sensitive detector and is compared therein with a reference signal derived from the modulation waveform of the radiation source, any error-signal output from the phase-sensitive detector is fed to the servo-motor, which thereupon drives the rotor of the synchro-resolver so as to reduce the electrical output signal therefrom towards zero, and the revolution counter records any rotary movement of the rotor of the synchro-resolver. Preferably a servo-amplifier is provided in which any error-signal output from the phase-sensitive detector is amplified by said servo-amplifier before being fed to the servo-motor.

According to a further optional feature of the invention the serve-motor is arranged so as to drive the rotor of the synchro-resolver through a gear box so that the ratio between the revolutions made by the servo-motor and the revolutions made by the rotor of the synchro-resolver is the gear box ratio.

According to yet a further optional feature of the invention the extended diffraction grating is a reflection grating and the source of cyclically modulated radiation, index gratings and photo-electric transducer means are arranged and adapted so as to cooperate therewith.

The term extended grating is to be understood in this specification to mean a grating the dimension of which in a direction substantially at right angles to the grating lines is large compared with the dimension in the same direction of any of the index gratings; and the extended grating may, for example, be linear, annular, or may be arranged circumferentially upon a cylinder.

When using an optical grating as a measurement or control system element there are several advantages to be gained by using a time-phase mode in accordance with the present invention where the grating spatial angle $\phi$ is made to generate an output time-phase signal $v_o$ where it takes the form $$v_o = \operatorname{Sin}(\omega t + \phi) \tag{1}$$

That is, the output signal is a constant amplitude signal $\operatorname{Sin} \omega t$ which lags a reference carrier $\sin \omega t$ by an amount in time equal to the transducer angle $\phi$.

The main advantages over a DC amplitude system are:
1. Amplitude variations do not cause errors.
2. Harmonic distortions can be removed by filtering.
3. DC drift does not cause errors.
4. The signal is compatible with other transducers such as the resolver and the inductosyn (registered trade mark).

Figure 4:
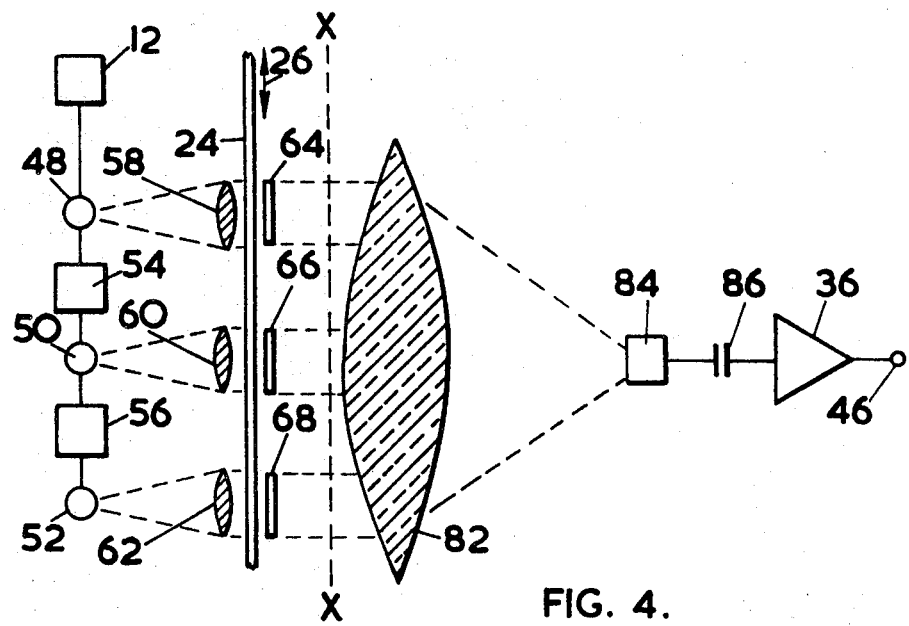
Figure 5:
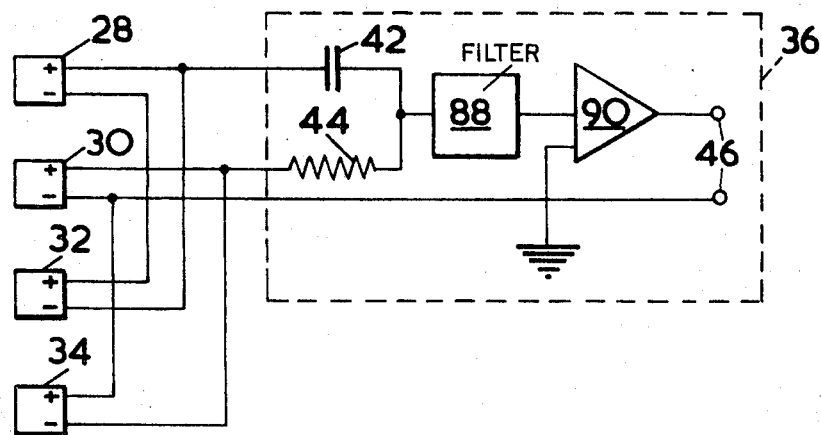
Figure 6:
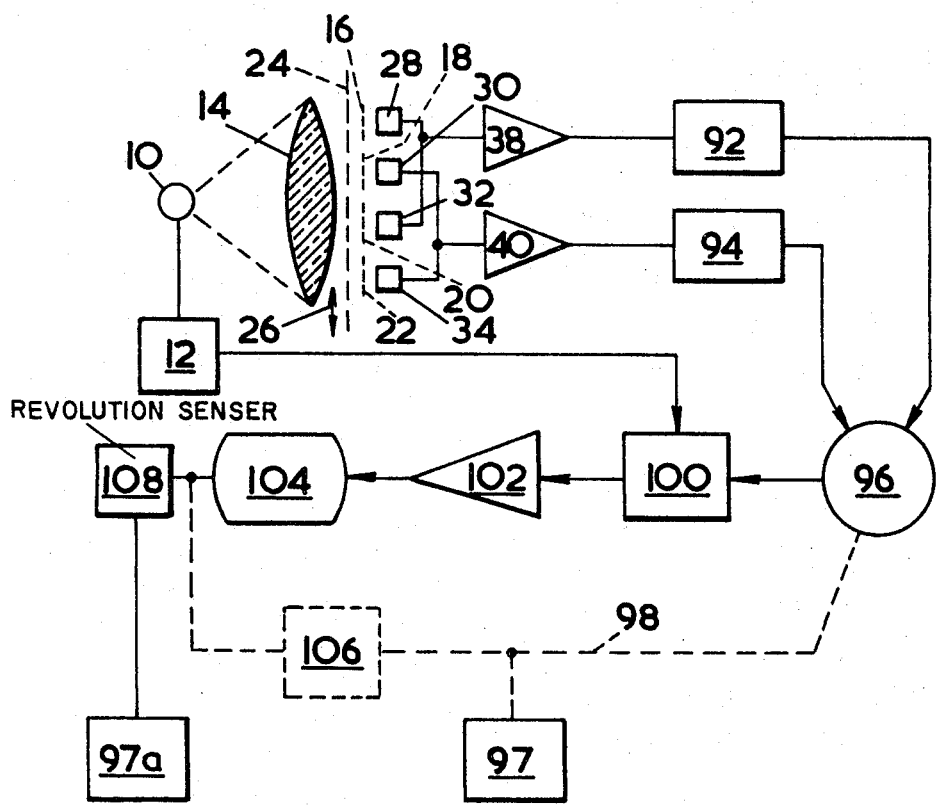

The invention will be further described with reference to the drawings in which:

FIG. 1 illustrates diagrammatically a first embodiment of the invention,

FIG. 2 illustrates diagrammatically an arrangement of index diffraction gratings for use in said embodiment, FIG. 3 illustrates diagrammatically a second embodiment and FIG. 4 illustrates diagrammatically a third embodiment, and with reference to the drawings filed herewith in which FIG. 5 illustrates diagrammatically a modification of the embodiment illustrated in FIG. 1 and FIG. 6 illustrates diagrammatically an application of the invention.

In the arrangement shown in FIG. 1, one gallium arsenide lamp 10 is modulated from oscillator means 12 and a single collimating lens 14 provides light over an area suitable for four index gratings 16, 18, 20, 22 and corresponding photodiodes 28, 30, 32, 34. The index grating and photodiodes are best arranged in a square formation to make best use of the circular lens 14 as illustrated in FIG. 2. The index gratings coact with a linear grating a portion of which is depicted at 24 and which can be moved relative to them, mounted on a moveable part, as indicated by the double arrow 26.

The waveforms due to the shutter actions at the linear grating/index grating junction are at 0°, 90°, 180° and 270° with respect to one another in spatial phase; index grating 16 corresponding to 0°, 18° to 90°, 20° to 180° and 22° to 270°.

The actual waveforms at the four cells are multiples of the lamp signal and the individual index signals and can be modified by any movement of the linear grating 24.

The photodiodes 28, 30, 32, 34 are connected to the amplifying means 36. The latter comprises two similar ac amplifiers 38, 40, a circuit comprising a capacitor 42 of capacitance C and a resistor 44 of resistance R, and an output connection 46. The photodiodes are connected to the amplifiers, as shown, in inverse parallel, permitting algebraic summation of the signals received by the photodiodes from the radiation source 10 through the linear grating and the index gratings. The capacitance C is chosen such that its reactance $X_c$ at the modulation frequency is equal to the resistance R; the output produced at connection 46 is then of the form $\cos(\omega t - \phi)$ if the modulation of the radiation source is of the form $\sin \omega t$, the phase angle being introduced by the spatial relation between the linear grating 24 and the index gratings 16, 18, 20, 22.

In the embodiment illustrated in FIG. 3 three lamps 48, 50, 52 are provided. These are modulated by oscillator means 12 and delay devices 54, 56 so that the modulation wave forms differ in time phase by 120°; that is to say if the modulation of lamp 48 is proportional to $\sin \omega t$, that of 50 is proportional to $\sin(\omega t + 120°)$ and that of 52 to $\sin(\omega t + 240°)$. Modulated light passes from the lamps through respective collimating lenses 58, 60, 62, through grating 24, through respective index gratings 64, 66, 68 to respective photodiodes 70, 72, 74. Resultant output signals produced by the photodiodes are fed through respective capacitors 76, 78, 80 to the amplifying means 36, which in this embodiment is a summing amplifier of conventional kind. Suitable selection of time constants, by conventional methods, allows low frequency components of the signals fed to the amplifier to be rejected and the output from connections 46 has then the form $\cos(\omega t - \phi)$ where $\omega t$ corresponds to the modulation and $\phi$ is the phase angle introduced by the spatial relation between the linear grating 24 and the index gratings 64, 66, 68.

The embodiment illustrated by FIG. 4 represents a further modification. The arrangements illustrated to the left of line XX in FIG. 4 are the same as those referenced similarly in FIG. 3. Instead of, as in the former embodiments, the modulated light passing from each lamp, through the diffraction gratings, to corresponding individual photodiodes, all the modulated light is collected by an imaging lens 82 and is focused thereby on to a single photodiode 84. The signal from the photodiode is fed through capacitor 86 to amplifying means 36, the summation being performed by the diode instead of by the amplifying means as in the former embodiment. The output from connections 46 of the amplifying means is then again sinusoidal, dependant upon the quantities $\omega t$, corresponding to the modulation, and $\phi$ the phase angle introduced by the spatial relation between the linear grating 24 and the index gratings 64, 66, 68.

Suitable modulation frequencies are between 1 and 3 KHz but lower or higher frequencies can be employed. Although in the embodiments described, transmission diffraction gratings have been illustrated it is equally possible, by a further modification, to use reflection gratings. The gratings which may be used range from coarse, 100 lines per inch or less to fine, 1,000 lines per inch or more according to the nature of the device which is being controlled or monitored and the work it has to perform.

An arrangement of index gratings mutually phased as described above with reference to FIG. 2 is available commercially, thus making the first embodiment described (FIG. 1) particularly advantageous if a compact construction is required. This can further be achieved by the use of integrated circuit amplifiers.

A modification which permits an economy in manufacture is illustrated in FIG. 5. The outputs from the photodiodes 28 and 32, 30 and 34 are taken in inverse parallel direct to capacitor 42 and resistor 44 respectively. A signal from the junction of 42 and 44 is fed through a high pass filter 88 to the single AC amplifier 90. The output of the amplifying means 36, produced at connections 46, is then, as before, of the form $\cos(\omega t - \phi)$ if the modulation of the radiation source 10 is of the form $\sin \omega t$.

A particular application of the invention is illustrated in a highly diagrammatic form in FIG. 6.

In FIG. 6, references which are the same as in FIG. 1 indicate the same integers having the same functions, but the conventionally illustrated circuit connections have been further simplified. Given the arrangement of reference gratings in the transducer set out above in the description of the embodiment of FIG. 1, the output signals from the amplifiers can be regarded as equivalent to resolver signals, of the form $\sin\omega t \sin\phi$ and $\sin\omega t \cos\phi$ The output signals from the amplifiers are passed through high-pass filters 92 and 94, which remove any direct voltages and low frequencies. After filtering the signals are fed to the stator windings of a synchro resolver 96, the electrical output from the rotor of the synchro resolver being connected to a phase-sensitive detector 100, and therein compared with the modulation of the radiation source as reference. Any difference between the rotor angle and the electrical angles $\sin\phi$, $\cos\phi$ corresponding to the signals fed to the stator of 96 will give rise to an error-signal output from the phase-sensitive detector 100, which output, amplified by amplifier 102, actuates the servo-motor 104. The motor 104 is arranged so as to drive the rotor of synchro-resolver 96, through a mechanical connection 98, in such a sense that the error-signal output from detector 100 is reduced, the resolver rotor being driven until the resolver output is zero. Thus for any given position of the transducer the servo loop comprising components 96, 100, 102, 104, 98, 96 will be nulled and any subsequent movement of the transducer will cause the servo-motor to follow the transducer output signals in synchronism, one revolution of the servo-motor and of the rotor of the resolver taking place for every movement of the grating 24 through one grating pitch. A revolution counter 97 driven from the mechanical connection 98 counts the revolutions of the rotor of synchro-resolver 96 and can be arranged so as to interpolate fractions of a cycle of the grating pitch.

If a gear box, represented diagrammatically at 106, having a gear ratio $m{:}n$, is introduced into the mechanical connection 98, then for every n revolutions of the rotor of the synchro resolver 96 the servo-motor 104 will make $m$ revolutions. A suitable pick-off device 108 of conventional kind, fitted to the shaft of servo-motor 104, senses the revolutions of that shaft and produces an electrical signal, indicated by 97A, directly representative of the servo-motor shaft revolutions. It is found that small errors in the gears at 106 are unimportant since such errors are spread only over one cycle of the transducer grating pitch and thus are averaged out in the long term over any substantial range of movement at the transducer. The signal from the servo-motor pick-off device and the corresponding number of cycles gone through by the synchro-resolver therefore can be arranged so as to provide together a suitable electrical ratio signal which can be applied to accurate measurements on gear pairs having a nominal gear ratio of $m{:}n$ For this purpose two sets of time-phase transducer apparatus of the kind illustrated in FIG. 6 are so arranged that a first set monitors the movement of the first gear wheel of a gear pair under test and a second set monitors the movement of the second gear wheel, the first wheel driving the second in the ratio $m{:}n$. In the first set of apparatus the drive from the servo-motor 104 to the synchro-resolver is direct, that is equivalent to a 1:1 ratio at the gear box 106; while in the second set of apparatus the gear box 106 has a ratio $n{:}m$. Thus the read-out at 97 would be the same for each set of apparatus, given that the gear pair under test were perfect. Any imperfection would be indicated by differences between the read-outs from the two sets of apparatus.

The arrangement of FIG. 1 employing four index gratings with associated photo-diodes can be simplified by reduction to two gratings, 16, 18 and photo-diodes 28, 30, the index gratings being in spatial quadrature one with the other. The simplified arrangement does not produce quite such satisfactory results as that illustrated, because a smaller portion of the extended grating 24 is employed at any time, and consequently there is less scope for elimination of grating error. Further, there is not the substantial elimination of direct voltages at the input to the amplifiers 38, 40 which is provided by the full inverse parallel connections illustrated in FIG. 1.

What I claim is:

1. A time-phase transducer apparatus comprising an extended diffraction grating, a set of at least two index diffraction gratings each of which coacts with part of said extended grating to produce an individual moire fringe pattern, the extended grating and the set of gratings being capable of relative movement, a source of cyclically modulated radiation of a given frequency which illuminates the aforesaid gratings to produce the individual moire fringe patterns, the radiation source producing a plurality of radiations of said given frequency but of different individual phases for each individual index grating and each index grating having an individual phase relationship with the extended grating whereby the resulting output arising from each index grating is a plurality of cyclically modulated beams of radiation bearing moire fringe patterns which differ in phase in a cyclically symmetrical manner, photo-electric transducer means for receiving the resulting outputs arising from each index grating and combining them to produce at least one cyclically modulated output signal which in consequence varies in phase in accordance with any relative movement between the extended grating and the set of index gratings.

2. Apparatus according to claim 1 in which one radiation source produces a single modulated radiation and $n$ index gratings (where $n$ is at least 3) are provided, arranged so that the moire fringe patterns differ from one another in spatial phase by a whole multiple of $1/n$ of 360°.

3. Apparatus according to claim 2 having four index gratings, differing in spatial phase by 90° or multiples thereof, four photo-electric cells for receiving the outputs from each index grating, a phase shifting circuit to which the photo-electric cells are connected in inverse parallel and which imposes relative phase shift of 90° on one input compared with that imposed on the other input so as to produce an output therefrom which contains the modulation frequency of the radiation source and varies in phase with relative movement between the extended grating and the index gratings.

4. Apparatus according to claim 3 in which the phase shifting circuit is a resistance-capacitance circuit.

5. Apparatus according to claim 1 and having $n$ radiation sources, where $n$ is at least 3, a corresponding number of index gratings and photo-electric cells, and oscillator means arranged to modulate the outputs of the radiation sources so that they differ from one another in time phase by whole multiples of $1/n$ of 360°.

6. Apparatus according to claim 5 and having signal output means which comprise a summing circuit to the input of which the outputs of the photo-electric transducer means are connected so that the output of the signal output means has substantially the same frequency as the modulation and varies in phase with relative movement between the extended grating and the set of index gratings.

7. Apparatus according to claim 1 said photo-electric transducer means having a single photo-electric cell, signal output means, and focusing means intermediate the set of index gratings and the photo-electric cell, arranged so that any resulting output arising from each one of the gratings in the set of index gratings is focused onto the photo-electric cell with the result that the output of the photo-electric transducer means has substantially the same frequency as the modulation of the radiation source and varies in phase with relative movement between the extended grating and the index gratings.

8. Apparatus according to claim 1 including a synchro-resolver, a phase-sensitive detector, a servo-motor and a revolution counter arranged so that any cyclically modulated output signal is fed to the stator of the synchro-resolver, any resulting electrical output signal from the rotor of the synchro-resolver is fed to the phase-sensitive detector and is compared therein with a reference signal derived from the modulation wave-form of the radiation source, any error-signal output from the phase-sensitive detector is fed to the servo-motor, which thereupon drives the rotor of the synchro-resolver so as to reduce the electrical output signal therefrom towards zero, and the revolution counter records any rotary movement of the rotor of the synchro-resolver.

9. Apparatus according to claim 8 including a servo-amplifier, in which any error-signal output from the phase-sensitive detector is amplified by said servo-amplifier before being fed to the servo-motor.

10. Apparatus according to claim 8 in which the servo-motor drives the rotor of the synchro-resolver through a gear box so that the ratio between the revolutions made by the servo-motor and the revolutions made by the rotor of the synchro-resolver is the gear box ratio.

11. Apparatus according to claim 1 in which the extended diffraction grating is a reflection grating and the source of cyclically modulated radiation, index gratings and photo-electric transducer means are arranged and adapted so as to cooperate therewith.

* * * * *

UNITED STATES PATENT OFFICE
CERTIFICATE OF CORRECTION

Patent No. 3,748,486                    Dated   July 24, 1973

Inventor(s)         Alexander Russell

It is certified that error appears in the above-identified patent and that said Letters Patent are hereby corrected as shown below:

Cover page, after item [21], insert --[30] Foreign Application Priority Data December 21, 1970 Great Britain 60481/70--.
Column 6, line 49, after "imposes" insert --a--.

Signed and sealed this 18th day of December 1973.

(SEAL)
Attest:

EDWARD M. FLETCHER, JR.                 RENE D. TEGTMEYER
Attesting Officer                       Acting Commissioner of Patents

UNITED STATES PATENT OFFICE
CERTIFICATE OF CORRECTION

Patent No. 3,748,486　　　　　　　　　Dated　July 24, 1973

Inventor(s)　　Alexander Russell

It is certified that error appears in the above-identified patent and that said Letters Patent are hereby corrected as shown below:

Column 1, line 45, "produced" should read --produces--. Column 2, line 40, "serve" should read --servo--. Column 3, line 39, "18°" and "20°" should read --18-- and --20--, respectively; line 40, "22°" should read --22--.

Signed and sealed this 5th day of March 1974.

(SEAL)
Attest:

EDWARD M. FLETCHER, JR.　　　　　C. MARSHALL DANN
Attesting Officer　　　　　　　　Commissioner of Patents